Jan. 2, 1951 J. J. ALIKONIS 2,536,340

METHOD AND APPARATUS FOR MAKING CONFECTIONERY

Filed July 1, 1947

INVENTOR.

Justin J. Alikonis,

BY

Cromwell, Greist & Warden

Attys.

Patented Jan. 2, 1951 2,536,340

UNITED STATES PATENT OFFICE 2,536,340

METHOD AND APPARATUS FOR MAKING CONFECTIONERY

Justin J. Alikonis, Bloomington, Ill., assignor to Paul F. Beich Company, Bloomington, Ill., a corporation of Illinois Application July 1, 1947, Serial No. 758,346

11 Claims. (Cl. 107—54)

1

This invention pertains to an improved, simplified and highly efficient method and apparatus for making foam-type confectionery in a continuous, as distinguished from a batch, process.

In my Patent No. 2,424,950, dated July 29, 1947, of which the present application is a continuation-in-part, I illustrate and describe an improved method and apparatus for the foregoing purpose in which supplies of a relatively viscous liquid confectionery stock and air under pressure are fed together through a porous diffus.ng agency in a manner to effect a thorough dispersion and diffusion of air globules throughout the mass of confectionery stock. This produces a frothy candy of improved foamy texture, and the operation involved is greatly simplified and expedited as compared with standard beating procedures heretofore practiced in the manufacture of related products. Said method and apparatus are also outstanding because of the economy of equipment, space, power and personnel which they make possible.

It is an object of the present invention to provide a still further improved, continuous, air diffusing and foaming process and apparatus of the general type referred to above, including further provisions for preliminary mixing air throughout the confectionery stock and for breaking up said stock into fine particle size, this involving an operation of atomizing the stock by mechanical impingement at relatively high velocity against a fixed target, prior to final diffusion or dispersion of the air throughout the ultimate product in the form of a multitude of fine, stock coated globules.

Another object is to provide a method and apparatus for the production of fine quality foam candy products which involve an initial, compound jetting and mixing of air and liquid candy stock, a subsequent mechanical atomization of the stock, and further mixture thereof with air under a turbulent condition and a final diffusion of the air-confectionery mixture by passage through a porous agency or medium.

Yet another object is to provide a method and apparatus of the foregoing type, which include a single-stage or multiple-stage mechanical atomization of the mixture of liquid confectionery stock and air, prior to ultimate dispersion of the air throughout the mass of confectionery stock by passage through a finely foraminated, diffusion element.

More specifically, it is an object to provide a method and apparatus including novel provisions for initially admixing predetermined proportion-

2 ate quantities of relatively viscous liquid confectionery stock and air under pressure by a jetting operation, for thereafter subjecting the preliminarily mixed product to a single or multiple-stage, mechanical agitating and atomizing operation by impingement at relatively high velocity against a fixed target or successive fixed targets, and for finally treating this agitated mixture to further break up and more minutely globulize the air bubbles and to diffuse the same more uniformly throughout the mass of confectionery stock by passage of said preliminary treated mass through a finely foraminated porous diffusing medium of a rigid, fused ceramic nature.

In another sense, it is an object to provide an improved method and apparatus for manufacturing foamy, aerated confectionery products, in which the equipment employed is devoid of moving parts, other than conventional material forwarding devices, hence, is free from the need for frequent repair or replacement operations.

The foregoing statements are indicative in a general way of the nature of the invention, but other and more specific objects will be apparent to those skilled in the art upon a full understanding of the construtcion and operation of the device.

One embodiment of the invention is presented herein for purpose of exemplification, but it will be appreciated that the invention is susceptible of incorporation in other modified forms coming equally within the scope of the appended claims.

My patent identified above sets forth in some detail certain disadvantages of conventional methods and apparatus employed in the production of foam type confectionery, such as marshmallow, nougat, and the like. It is not deemed necessary to repeat these points in the present specification, but it may be pointed out briefly that previous procedures are uneconomical in respect to the excessive time required to complete the mechanical beating which is normally incident thereto and the relatively expensive and space-consuming equipment installations required, as well as excessive power demand to operate the equipment and considerable personnel needed to tend and supervise the equipment. These objections are in large measure eliminated by the process and apparatus described in said patent, which involves the continuous passing of a mass of viscous liquid confectionery stock mixed with air under pressure through a porous diffuser to thoroughly and uniformly diffuse said air throughout said stock in the form of a multitude of extremely fine globules. The resultant product is notable for its fine uniform texture and light, frothy or foamy quality, notwithstanding the high rate of production thereof.

The present method pertains to certain refinements in the method and apparatus referred to whereby these attributes are even further improved and whereby increased reliability and uniformity of output are guaranteed.

Figure 1:
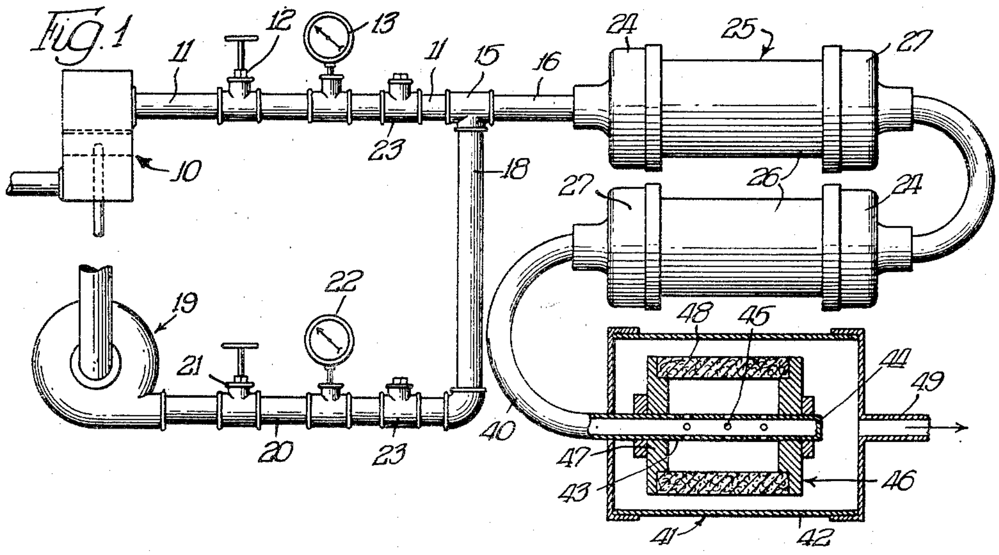
Fig. 1 is a fragmentary and generally diagrammatic view illustrating the arrangement of parts of an apparatus for performing the continuous production method of the invention, being partially broken away and in axial section through the diffusing chamber of said apparatus.

Referring to Fig. 1 of the drawings, which represents a diagrammatic and conventionalized layout of the apparatus involved, a positive displacement, plunger-type pump 10 or equivalent instrumentality is employed for forwarding the somewhat viscous heated mass of liquid confectionery stock to be processed, said pump being driven by an appropriate prime mover. The stock may be a well known type of marshmallow mix, a nougat mix, or any other mixture or compound of confectionery ingredients to which it is desired to impart a frothy, foamy characteristic by aeration. Details pertaining to the composition of such mixtures are set forth in my patent identified above and, with general reference to the materials which may be handled, the present system is very similar to that embodied in said application.

Figures 2, 3:
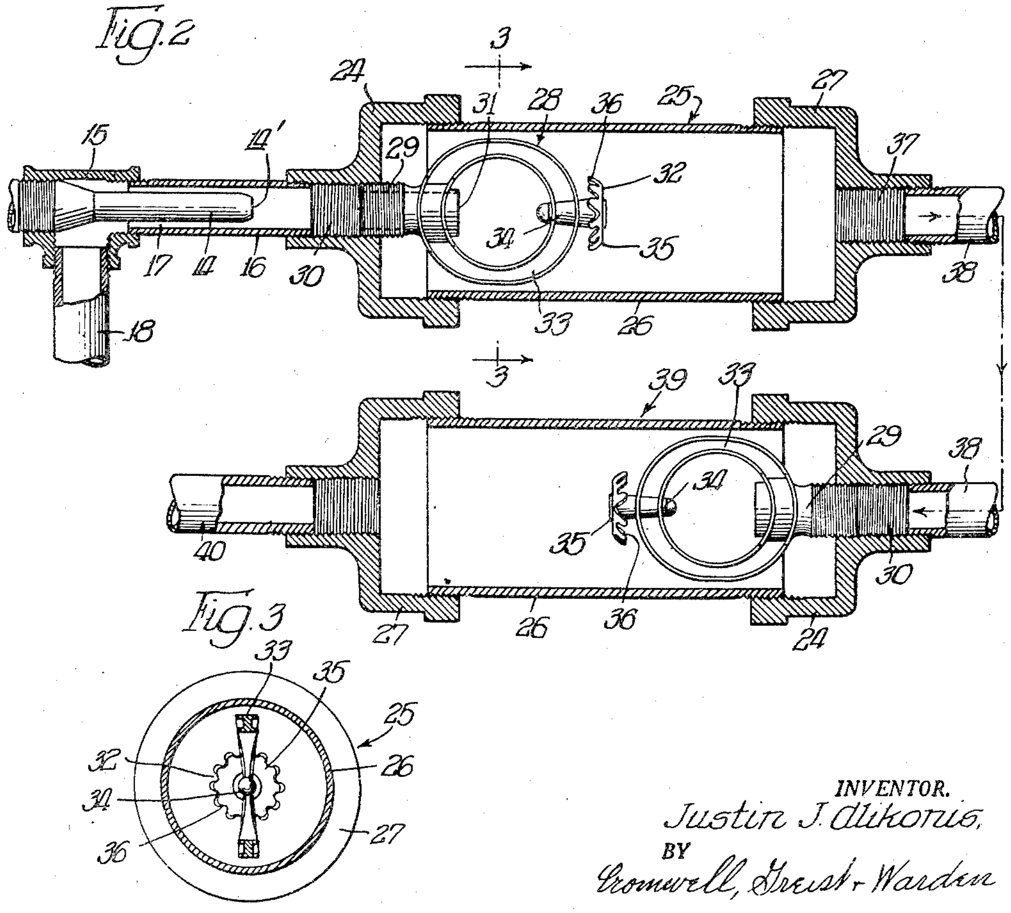
Fig. 2 is a fragmentary enlarged view in longitudinal vertical section through a portion of the apparatus illustrated in Fig. 1, wherein preliminary mixing and atomization of confectionery stock and air are effected.
Fig. 3 is a view in section taken on line 3—3 of Fig. 2 to further illustrate details of the atomizing unit.

The pump 10 forwards the confectionery mix through a feed or supply line 11, wherein a suitable control valve 12 and pressure gauge 13 are installed, to the end that the volume, rate of flow and pressure of the mass of confectionery stock forwarded may be regulated as desired. Said supply line 11 terminates in a nozzle 14 of reduced size (see Fig. 2), which is internally received in a T fitting 15. Said nozzle extends axially through the aligned tapped openings of the head of said fitting and projects into a concentric mixing tube 16 of somewhat larger diameter than the nozzle. Nozzle 14 is provided with an orifice 14′ of somewhat constricted area of cross section through which the stock is jetted at a relatively high velocity.

Air under pressure is supplied to tube 16 and to the annular space 17 between the same and nozzle 14 by means of an air supply line 18 which is tapped into the leg or stem of T 15, said line being supplied with air under pressure from a suitably driven air compressor, blower or other air source 19. A conduit 20, in which a pressure control valve or regulator 21 and a pressure gauge 22 are installed, connects said compressor with the air line 18. Further check valves 23 are installed in each of the lines 11 and 20 to prevent reverse flow. The pressures and relative proportions of the mass of liquid stock and air to be diffused are properly regulated in the lines 11 and 20, in accordance with the constitution of the liquid mass, the desired texture of the ultimate product, and other considerations.

A preliminary admixture of the air in the liquid stock is effected in mixing tube 16 as the stream of stock jets from nozzle 14 into the annular path of the traveling air. The expansion of the latter at the nozzle orifice 14′ results in considerable intermixing of the air and stock and initial globulization of the latter in the mixing tube.

Tube 16 is threaded into the flanged head 24 of a mixing, aerating and atomizing chamber generally designated 25, which chamber also includes an elongated cylindrical body 26 threadedly received in fitting 24, and a flanged tail fitting 27 similarly threaded onto the opposite end of said body. The chamber 25 houses a target-type atomizing device 28, in the form of a hollow tubular nipple 29 arranged concentrically in body 26 and threadedly received in one end of the tapped passage 30 through the head fitting 24. The mixing tube 16 is also threaded into this passage at the opposite or inlet end thereof. Accordingly, the air-liquid mix discharging from tube 16 traverses the interior of the passage 30 and tubular nipple 29, with more or less agitation and turbulence during flow, prior to issuing at considerable velocity from the inner discharge mouth 31 of said nipple.

A target, designated by the reference numeral 32, is disposed in axial alignment with said discharge mouth 31, being held in fixed relation thereto by the integral two-armed spider 33. Said target 32 has a conical, rearwardly-tapered nose portion 34 in alignment with the discharge mouth 31, against which the mixture issuing from the latter first impinges at considerable velocity. Said tapered nose merges forwardly into a terminal, rearwardly flared or dished annular skirt 35, also adapted to be impinged by the mix, in a manner to direct the fluid mixture radially outwardly against the interior wall of the cylindrical body 26 of the chamber. It is evident that the traveling mass is thus split axially into a conical sheet which is hurled at high velocity in the direction of the wall of said body. In order to further the desired agitation and atomization of the liquid impinging the target 32, the skirt 35 thereof is scalloped along its rearwardly and outwardly directed free edge, as indicated at 36. These provisions result in a very substantial breaking up and finer globulization of the preliminarily mixed liquid-air product and tend to effect a substantially more thorough and uniform distribution of the air throughout the liquid mass.

Leaving the chamber 25 through the central aperture 37 of tail member 27, and through the discharge pipe 38 threaded therein, the mixed and atomized product undergoes a second stage or mixing, aeration and atomization in the chamber generally designated 39. This chamber is identical with and operates in all respects in the same manner as the chamber 25, the pipe 38 serving the function of a supply member therefor in the same fashion as the initial mixing tube 16. Hence, the elements associated with the chamber 39 are indicated by the same reference numerals as the corresponding parts of chamber 25. The mixing and distribution of the globules of air in the mix and the atomization of the liquid are furthered substantially in chamber 39, with increased uniformity of texture and frothiness upon discharge of the product through the line 40. As many stages of atomization, mixing and aeration in chambers of the above described type may be performed as are necessitated by the character and proportionate composition of the ingredients involved. However, I have secured highly desirable results with two stages, as shown in the drawings, in the foaming of marshmallow and nougat confections.

Leaving the discharge line 40, the liquid-air mixture passes into a diffusing chamber 41 identical with that shown and described in my patent referred to above. This chamber comprises an outer cylindrical casing 42 apertured at one end for the reception of the central tube 43 which communicates with the line 40. The end of tube 43 is closed at 44 and it is provided with a plurality of discharge apertures 45 through which the air-liquid mix flows under pressure into the interior of the surrounding diffusing member, which is generally designated 46. A substantial working and agitation of the mix occurs during said discharge through apertures 45 to further the uniformity of distribution of air globules in the mass.

Diffuser member 46 comprises a pair of apertured end closure disks 47, which are fixedly mounted in concentric relation to tube 43, and the rigid ceramic diffusion sleeve 48 which is rigidly clamped between said disks. Said sleeve is preferably fabricated of fused aloxite or other fused ceramic material characterized by multitudinous fine passages interwoven therethrough and, upon passing through this material, the air-liquid mix receives a final, exceedingly thorough working, resulting in substantial minimization of size of the air globules therein and a final distribution of said globules throughout the liquid. The ultimate diffused product is discharged from chamber 41 through the tail pipe 49 which communicates with one end thereof.

It is apparent from the foregoing that I have provided a multi-stage method of manufacturing foam-type confectionery products, including jetting or non-positive admixture of air and liquid stock as a first step, mechanical agitation, atomization and further admixture of the air and stock as a second step in which said air and stock are mechanically impinged at high velocity against a fixed target and deflected therefrom with considerable turbulence, and a final straining and diffusing action through a porous or foraminated medium, whereby the uniformity of distribution of minute air globules throughout the stock is brought to its desired degree.

The process and apparatus afford a close control in the make-up of the ultimate product, and, other than the basic material-forwarding instrumentalities 10, 19, is devoid of moving parts adapted to become inoperative, to accumulate material and to require frequent cleaning or the like.

I claim:

1. A method of making foam type confectionery, comprising the steps of advancing liquid confectionery stock, confining and pre-mixing said stock with a gaseous diffusion medium, subjecting said pre-mixed stock and medium to a preliminary impact atomizing operation, and thereafter passing said stock and gaseous diffusion medium through a porous diffusing agency to globulize said medium and distribute the same uniformly throughout said stock.

2. A method of making foam type confectionery, comprising the steps of advancing a mixture of liquid confectionery stock and a gaseous medium under pressure, confining and pre-mixing said advancing stock and medium, subjecting said mixture to a preliminary impact atomizing operation, and thereafter passing said mixture through a porous diffusing agency to globulize said medium and distribute the same uniformly throughout said stock.

3. A method of making foam type confectionery, comprising the steps of advancing a mixture of liquid confectionery stock and a gaseous medium under pressure, confining and pre-mixing said advancing stock and medium, subjecting said mixture to a preliminary impact atomizing operation by impinging the same at substantial velocity against a target, and thereafter passing said mixture through a porous diffusing agency to globulize said medium and distribute the same uniformly throughout said stock.

4. A continuous method of making foam-type confectionery, comprising continuously mixing and advancing under pressure liquid confectionery stock and air under pressure, confining and pre-mixing said advancing stock and medium, subjecting said mixture to an impact atomizing operation by impinging the same at substantial velocity against a target, and thereafter passing the mixture through a porous diffusing agency to minutely globulize the air and distribute the same uniformly throughout said stock.

5. A continuous method of making foam-type confectionery, comprising continuously mixing and forwarding under pressure liquid confectionery stock and air under pressure, subjecting said mixture to successive impact atomizing operations by impinging the same at substantial velocity against targets, and thereafter passing the mixture through a porous diffusing agency to minutely globulize the air and distribute the same uniformly throughout said stock.

6. Apparatus for producing foam-type confectionery, comprising means for advancing a mass of confectionery stock and a proportionate volume of gaseous diffusion medium, a discharge line for said means to confine said stock and medium, said line including means to pre-mix said advancing stock and medium, an atomizing device in receiving relation to said line to atomize said stock and further the diffusion of said medium therethrough, and a diffusion device in receiving relation to said atomizing device to perfect the diffusion of said medium through said stock in the form of a multitude of fine globules.

7. Apparatus for producing foam-type confectionery, comprising means for advancing a mass of confectionery stock and a proportionate volume of gaseous diffusion medium, a discharge line for said means to confine said stock and medium, said line including means to pre-mix said advancing stock and medium, an atomizing device in receiving relation to said line to atomize said stock and further the diffusion of said medium therethrough, and a diffusion device in receiving relation to said atomizing device comprising a porous diffusion member through which said mixture is discharged from the atomizing device under pressure to perfect the diffusion of said medium through said stock in the form of a multitude of fine globules.

8. Apparatus for producing foam-type confectionery, comprising means for advancing a mass of confectionery stock and a proportionate volume of gaseous diffusion medium, a discharge line for said means to confine said stock and medium, said line including means to pre-mix said advancing stock and medium, an atomizing device comprising a chamber disposed in receiving relation to said line and having a target therein adapted to be impinged by the mixture of stock and medium discharged from said line whereby to atomize said stock and further the diffusion of said medium therethrough, and a diffusion device in receiving relation to said atomizing device to perfect the diffusion of said medium through said stock in the form of a multitude of fine globules.

9. Apparatus for producing foam-type confectionery, comprising means for advancing a mass of confectionery stock and a proportionate volume of gaseous diffusion medium, a discharge line for said means to confine said stock and medium, said line including means to pre-mix said advancing stock and medium, an atomizing device comprising a chamber disposed in receiving relation to said line and having a target therein adapted to be impinged by the mixture of stock and medium discharged from said line whereby to atomize said stock and further the diffusion of said medium therethrough, and a diffusion device in receiving relation to said atomizing device comprising a porous diffusion member through which said mixture is discharged from the atomizing device under pressure to perfect the diffusion of said medium through said stock in the form of a multitude of fine globules.

10. Apparatus for continuously producing foam-type confectionery, comprising means for continuously forwarding and mixing a mass of confectionery stock and a proportionate volume of gaseous diffusion medium, an atomizing device comprising a chamber in receiving relation to said forwarding and mixing means, said device having a target fixedly mounted therein adapted to be impinged by the mixture discharged from said line whereby to atomize said stock and further the diffusion of said medium therethrough, and a diffusion device in receiving relation to said atomizing device comprising a porous diffusion member through which said mixture is discharged from the atomizing device under pressure to perfect the diffusion of said medium through said stock in the form of a multitude of fine globules.

11. A method of manufacturing foamed confectionery comprising the steps of advancing confectionery stock and a gaseous foaming medium, pre-mixing said stock and medium and impinging said pre-mixed stock and medium against a target at substantial velocity to break up particles of said stock and to further the mixture of said medium throughout the stock in the form of a multitude of stock coated globules.

JUSTIN J. ALIKONIS.

REFERENCES CITED

The following references are of record in the file of this patent:

UNITED STATES PATENTS

| Number | Name | Date |
|---|---|---|
| 2,424,950 | Alikonis | July 29, 1947 |

FOREIGN PATENTS

| Number | Country | Date |
|---|---|---|
| 365,513 | Great Britain | Jan. 11, 1932 |
| 409,918 | Great Britain | May 10, 1934 |